US010416812B2

(12) United States Patent
Li et al.

(10) Patent No.: US 10,416,812 B2
(45) Date of Patent: Sep. 17, 2019

(54) DISPLAY SUBSTRATE AND METHOD FOR TESTING THE SAME, DISPLAY APPARATUS (71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yanchen Li, Beijing (CN); Panhua Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 153 days.

(21) Appl. No.: 15/324,796

(22) PCT Filed: Mar. 25, 2016

(86) PCT No.: PCT/CN2016/077344
§ 371 (c)(1),
(2) Date: Jan. 9, 2017

(87) PCT Pub. No.: WO2017/041480
PCT Pub. Date: Mar. 16, 2017

(65) Prior Publication Data
US 2017/0205956 A1    Jul. 20, 2017

(30) Foreign Application Priority Data

Sep. 11, 2015  (CN) .......................... 2015 1 0580513

(51) Int. Cl.
*G06F 3/041* (2006.01)
*G02F 1/1333* (2006.01)
(Continued)

(52) U.S. Cl.
CPC .......... *G06F 3/0418* (2013.01); *G02F 1/1309* (2013.01); *G02F 1/13338* (2013.01);
(Continued)

(58) Field of Classification Search
None
See application file for complete search history.

(56) References Cited

U.S. PATENT DOCUMENTS

2003/0122975 A1    7/2003  Kim et al.
2016/0358525 A1*  12/2016  Huang ................. G09G 3/3655
2016/0364068 A1*  12/2016  Cheng ................. G06F 3/0416

FOREIGN PATENT DOCUMENTS

CN    102455960 A    5/2012
CN    103955309 A    7/2014
(Continued)

OTHER PUBLICATIONS

First Office Action dated Aug. 3, 2017 corresponding to Chinese application No. 201510580513.9.
(Continued)

Primary Examiner — Ifedayo B Iluyomade
(74) Attorney, Agent, or Firm — Nath, Goldberg & Meyer; Joshua B. Goldberg (57) ABSTRACT Embodiments of the invention provide display substrate, method for testing the same and display apparatus. The display substrate includes pixel regions arranged in matrix and test unit, each pixel region being provided with first electrode, wherein the test unit includes at least two test sub-units; first electrodes provided in adjacent pixel regions correspond to electrode block, and electrode blocks are electrically isolated from each other and divided, in accordance with their positions, into at least two test groups whose number is the same as that of the test sub-units; the electrode blocks of a same test group are provided spaced
(Continued)

apart from each other in both row and column directions, and all the electrode blocks in the same test group are connected to one test sub-unit. The test unit can accurately test open or short defect existing in the display substrate, thereby improving test accuracy and lowering production costs.

5 Claims, 7 Drawing Sheets

(51) Int. Cl.
    *G06F 3/044*     (2006.01)
    *G02F 1/13*     (2006.01)
    *G09G 3/00*     (2006.01)

(52) U.S. Cl.
    CPC ............ *G06F 3/044* (2013.01); *G06F 3/0412* (2013.01); *G09G 3/006* (2013.01); *G09G 2330/12* (2013.01)

(56) References Cited

FOREIGN PATENT DOCUMENTS

| CN | 104880840 A | | 9/2015 | |
|----|-------------|---|--------|---|
| CN | 105093593 A | | 11/2015 | |
| JP | H10-268273 A | | 10/1998 | |
| TW | 201643630 | * | 6/2015 | ............ G06F 3/041 |
| TW | 201643635 | * | 6/2015 | ............ G06F 3/041 |

OTHER PUBLICATIONS

International Search Report dated Jun. 21, 2016 issued in corresponding International Application No. PCT/CN2016/077344 along with an English translation of the Written Opinion of the International Searching Authority.

* cited by examiner

|    |    |    |
|----|----|----|
| 11 | 12 | 13 |
| 21 | 22 | 23 |
| 31 | 32 | 33 |

FIG. 4B

|    |    |    |
|----|----|----|
| 11 | 12 | 13 |
| 21 | 22 | 23 |
| 31 | 32 | 33 |

DISPLAY SUBSTRATE AND METHOD FOR TESTING THE SAME, DISPLAY APPARATUS

This is a National Phase Application filed under 35 U.S.C. 371 as a national stage of PCT/CN2016/077344 filed on Mar. 25, 2016, an application claiming the benefit of Chinese Application No. 201510580513.9 filed on Sep. 11, 2015, the content of each of which is hereby incorporated by reference in its entirety.

TECHNICAL FIELD

The present invention belongs to the field of display technology, and particularly relates to a display substrate, a method for testing the display substrate, and a display apparatus.

BACKGROUND

To achieve a lighter and thinner touch display panel, the research on integrations of touch panel and liquid crystal display panel becomes popular. Among others, the In-Cell touch solution in which a touch function is embedded into the liquid crystal display panel has been widely concerned. The In-Cell touch solution generally includes a self-capacitive solution and a mutual-capacitive solution.

Figure 1:
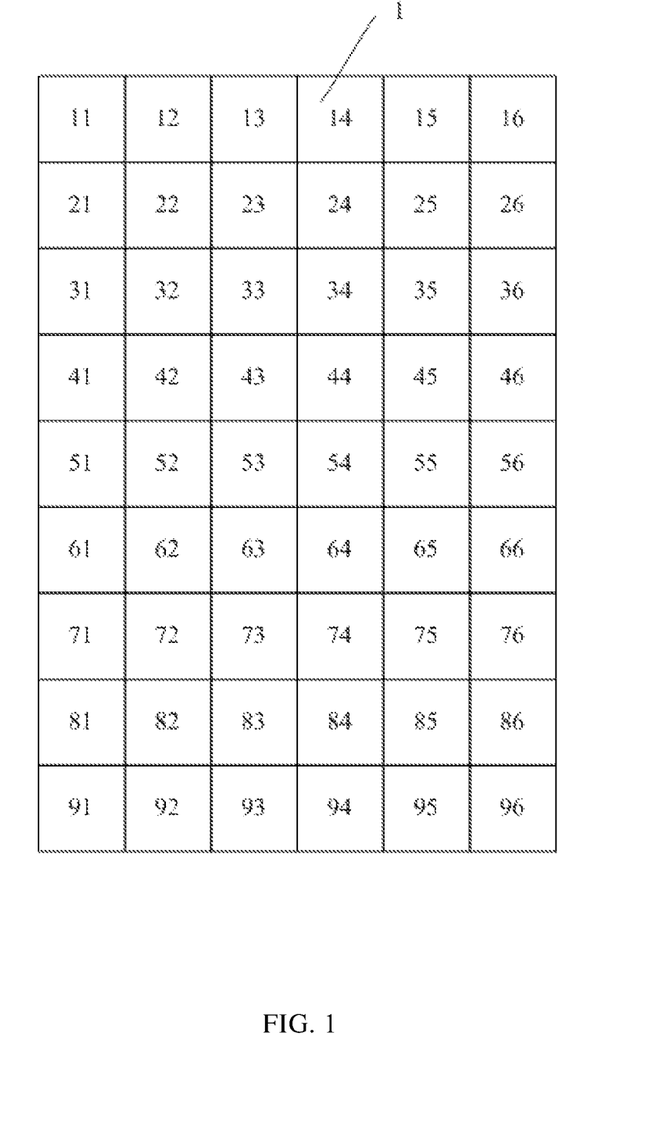
FIG. 1 is a schematic diagram illustrating an arrangement of electrode blocks of a display substrate in the prior art.

Specifically, as for a liquid crystal display panel with an advanced super dimension switch (ADSDS) mode, the self-capacitive In-Cell touch solution is as follows: as shown in FIG. 1, a metal layer serving as a common electrode in the liquid crystal display panel is divided into several blocks (i.e., electrode blocks) insulated from each other and serving as touch sensor units, and the touch sensor units are connected to a driving IC through specific metal wires. When the liquid crystal display panel is touched by a finger, the capacitance value of a touch sensor unit at a position corresponding to the touch is changed (or, the voltage value of the common electrode at the position is changed), and the driving IC detects the change of the capacitance value to determine the touched position, thereby achieving the touch control function.

It is necessary to perform an electric test (ET) on a touch display panel so as to ensure product quality. For simplification of structure and improvement of test efficiency, a method in which an electric test on display function and touch control function of a touch display panel is performed though a single structure has been proposed currently. The existing ET structure, however, can only simultaneously apply a same test signal to all touch sensor units by controlling test switches, and thus cannot test the short defect between different touch sensor units. Moreover, when the open defect occurs for a touch sensor unit, the touch sensor unit is in a floating state in which the test signal cannot be applied thereto, and has a small uncertain voltage close to an initial zero potential. Therefore, in a case where a test on the display function of the touch display panel is performed and the applied test signal has a voltage value of 0 V, although there may be a difference in brightness between a display area corresponding to the touch sensor unit (which has the open defect) and a display area corresponding to other touch sensor unit in a normal state, such difference in brightness may be too small to be recognized by human eyes, which finally results in that the possibly existing open defect cannot be detected.

Moreover, the self-capacitive In-Cell design requires the use of expensive Touch & Display Driver IC (TDDI) components. Therefore, it is necessary to improve detection rate of defects for the touch display panel as high as possible before the assembling process, so as to reduce, to the largest extent, loss of materials (particularly, loss of the TDDI components) in the assembling process due to the defect of the touch display panel.

However, the ET solutions designed for the existing ADSDS-type self-capacitive touch display panels cannot detect the short defect between different touch sensor units, and cannot ensure that the open defects of the touch sensor units have been completely detected. As a result, the test results are not accurate, and the detection rate of the defective products is low. If the touch display panel having defects is transferred to the assembling stage, a large amount of materials such as polarizers POL, driving ICs and flexible printed circuits FPCs may be lost, and the production costs may be increased. Thus, there needs a technical solution by which the open or short defect of a touch display panel can be accurately tested so as to improve the test accuracy, improve the detection rate of defective products and lower the production costs.

SUMMARY

In view of the shortcomings existing in the prior art, embodiments of the present invention provide a display substrate, a method for testing the same, and a display apparatus, capable of accurately testing the open or short defect of the display substrate, improving the test accuracy, improving the detection rate of defective products, and lowering the production costs.

According to an embodiment of the present invention, there is provided a display substrate including a plurality of pixel regions arranged in a matrix manner and a test unit, each of the pixel regions being provided with a first electrode, wherein the test unit includes at least two test sub-units; the first electrodes provided in adjacent pixel regions correspond to an electrode block, and the electrode blocks are electrically isolated from each other and divided, in accordance with their positions, into at least two test groups whose number is the same as that of the test sub-units; the electrode blocks belonging to a same test group are provided to be spaced apart from each other in both row and column directions, and all the electrode blocks in the same test group are connected to one of the test sub-units.

The test unit may include one driving signal terminal, test signal terminals whose number is the same as that of the test sub-units, and a plurality of switch thin film transistors whose number is the same as that of the electrode blocks; the test signal terminals are in a one-to-one correspondence with the test groups; gate electrodes of all the switch thin film transistors may be connected to the driving signal terminal, a source electrode of each switch thin film transistor may be connected to one of the electrode blocks, and a drain electrode of the each switch thin film transistor may be connected to one of the test signal terminals which corresponds to the test group to which the one of the electrode blocks connected to the source electrode of the each switch thin film transistor belongs.

The display substrate may include a display area and a non-display area surrounding a periphery of the display area, the plurality of pixel regions may be located in the display area, the test units may be provided in the non-display area, and the electrode blocks may be connected to the source electrodes of the switch thin film transistors through metal wires.

The test unit may include a first test sub-unit and a second test sub-unit, the test groups may include a first test group and a second test group, every other electrode blocks in the row direction and the column direction may be set as the first test group, and the remaining electrode blocks may be set as the second test group; the electrode blocks of the first test group may be electrically connected to the first test sub-unit, and the electrode blocks of the second test group may be electrically connected to the second test sub-unit.

Adjacent electrode blocks at both sides of each of the electrode blocks of the first test group in the row direction and the column direction are the electrode blocks of the second test group, and adjacent electrode blocks at both sides of each of the electrode blocks of the second test group in the row direction and the column direction are the electrode blocks of the first test group, expect for the outermost electrode blocks located at edges of the display substrate.

A size of each electrode block may be comparable to an area touched by a finger.

A size of each electrode block may be 4 mm×4 mm.

Each electrode block may be formed as a touch sensor unit.

Each pixel region may include three or four sub-pixel regions, more than one pixel regions may share the first electrode, and the first electrode may be a common electrode.

According to an embodiment of the present invention, there is provided a display apparatus, including any one of the above display substrates.

According to an embodiment of the present invention, there is provided a method for testing a display substrate including a plurality of pixel regions arranged in a matrix manner and a test unit, each of the pixel regions being provided with a first electrode, the test unit including at least two test sub-units, the first electrodes provided in adjacent pixel regions corresponding to an electrode block, the electrode blocks being electrically isolated from each other and divided, in accordance with their positions, into at least two test groups whose number is the same as that of the test sub-units, the electrode blocks belonging to a same test group being provided to be spaced apart from each other in both row and column directions, all the electrode blocks in the same test group being connected to one of the test sub-units, and the method includes:

applying a same voltage or different voltages to the electrode blocks belonging to different test groups, and determining, according to colors displayed in the pixel regions of the display substrate, the display function of the display substrate and the electrical properties of self-capacitive touch electrodes formed by the electrode blocks.

The test unit may include one driving signal terminal, test signal terminals whose number is the same as that of the test sub-units, and a plurality of switch thin film transistors whose number is the same as that of the electrode blocks; the test signal terminals are in a one-to-one correspondence with the test groups; gate electrodes of all the switch thin film transistors may be connected to the driving signal terminal, a source electrode of each switch thin film transistor may be connected to one of the electrode blocks, and a drain electrode of the each switch thin film transistor may be connected to one of the test signal terminals which corresponds to the test group to which the one of the electrode blocks connected to the source electrode of the each switch thin film transistor belongs; and the method includes:

applying, according to types of the switch thin film transistors, a voltage to the gate electrodes of the switch thin film transistors through the driving signal terminal such that the switch thin film transistors are in an ON state; and applying a same voltage signal or different voltage signals to the drain electrodes of the plurality of switch thin film transistors through different test signal terminals, respectively, so as to test the display function of the display substrate and the open or short defect of the self-capacitive electrodes formed by the electrode blocks.

The method may include keeping the switch thin film transistors in the ON state, and applying a same voltage to the electrode blocks of the at least two test groups through different test signal terminals, respectively; if the pixel regions corresponding to each electrode block display a color corresponding to a set mode, determining that the display function of the display substrate is normal, and that the electrical properties of the self-capacitive touch electrodes formed by the electrode blocks are normal; and if the pixel regions corresponding to any electrode block display a color not corresponding to the set mode, determining that the self-capacitive touch electrode formed by the electrode block has an open defect.

The electrode blocks may be divided into two test groups, and the set mode is a normally black mode, in which the pixel regions display black images accordingly in a case where the electrode blocks of the two test groups are not applied with voltage signals and the plurality of pixel regions are not applied with data signals; and the method may include:

applying a first voltage to the electrode blocks of the two test groups through different test signal terminals, respectively, and applying a data signal of a second voltage to the plurality of pixel regions, and if the pixel regions corresponding to each electrode block display white images having grey-scale, determining that the display function of the display substrate is normal; and applying the second voltage to the electrode blocks of the two test groups through different test signal terminals, respectively, and applying the data signal of the second voltage to the plurality of pixel regions, and, if the pixel regions corresponding to each electrode block display black images, determining that the self-capacitive touch electrodes formed by the electrode blocks have no open defect, and if pixel regions corresponding to any electrode block display a white image, determining that the self-capacitive touch electrode formed by the electrode block has an open defect;

wherein the second voltage is higher than the first voltage.

The method may include keeping the switch thin film transistors in the ON state, and applying different voltages to the electrode blocks of the at least two test groups through different test signal terminals, respectively; if the pixel regions corresponding to each electrode block display a color corresponding to a set mode, determining that the electrical properties of the self-capacitive touch electrodes are normal; and if the pixel regions corresponding to any electrode block display a color not corresponding to the set mode, determining that there is a short defect between the self-capacitive touch electrode formed by the electrode block and a self-capacitive touch electrode formed by an adjacent electrode block.

The electrode blocks may be divided into to two test groups, and the set mode is a normally black mode, in which the pixel regions display black images accordingly in a case where the electrode blocks of the two test groups are not applied with voltage signals, and the method may include:

applying a first voltage and a second voltage to electrode blocks of the two test groups through different test signal terminals, respectively; if the pixel regions corresponding to adjacent electrode blocks display a white image and a black image, respectively, determining that there is no short defect between the self-capacitive touch electrodes formed by the electrode blocks; and if the pixel regions corresponding to adjacent electrode blocks each display a black image, determining that there is a short defect between the self-capacitive touch electrodes formed by the electrode blocks.

The first voltage may be zero volt, and the second voltage may be 5 volts.

In the display substrate provided in the embodiments of the present invention, the touch function can be preliminarily tested in a same manner as that for testing the display function by the improvement of the structure of the test unit and the use of the corresponding method for testing the display substrate. Therefore, it is possible to perform not only the existing test for the display function but also the preliminary test for the touch function of the display substrate in the test procedure for the display substrate, such that the open defect or short defect existing in the self-capacitive touch electrode formed by the electrode block can be detected, and that the detection rate of the defects can be improved, to the largest extent, before the assembling stage. The product yield of the display substrates can be improved, and it further ensures that the materials can be effectively used in the assembling stage, the loss of the materials due to the defects can be reduced in the assembling stage, the production costs are lowered, and the production profits are increased.

REFERENCE NUMERALS

1—electrode block; 110—first electrode block; 120—second electrode block; 2—switch thin film transistor; 3—driving signal terminal; and 4—test signal terminal.

DETAILED DESCRIPTION OF THE EMBODIMENTS

To make those skilled in the art better understand the technical solutions of the present invention, the display substrate, the method for testing the display substrate, and the display apparatus will be described below in detail in conjunction with the accompanying drawings and specific embodiments.

First Embodiment

The present embodiment provides a display substrate provided with a test unit therein. The test unit is configured to test the display function of the display substrate and electrical properties of self-capacitive touch electrodes. The test unit is capable of accurately testing the open or short defect of the touch electrodes of the display substrate, improving the test accuracy, improving the detection rate of defective products, and lowering the production costs.

The display substrate includes a plurality of pixel regions arranged in a matrix manner and a test unit, each of the pixel regions being provided with a first electrode, wherein the test unit includes at least two test sub-units; the first electrodes provided in adjacent pixel regions correspond to an electrode block, and the electrode blocks are electrically isolated from each other and divided, in accordance with their positions, into at least two test groups whose number is the same as that of the test sub-units; the electrode blocks belonging to a same test group are provided to be spaced apart from each other in both row and column directions, and all the electrode blocks in the same test group are connected to one of the test sub-units.

In the display substrate of the present embodiment, each pixel region includes three or four sub-pixel regions, and each sub-pixel region includes a second electrode, which is a pixel electrode of a plate-like structure; more than one pixel regions share the first electrode, and the first electrode is a common electrode. In the pixel regions, the common electrode is of a slit structure and is positioned above the pixel electrode. That is, the exemplary display substrate in the present embodiment is a display substrate with an advanced super dimension switch (ADSDS) mode, in which a multi-dimensional electric field is formed by an electric filed generated from edges of slit electrodes in a same plane and an electric field generated between a layer of slit electrodes and a layer of plate-like electrode such that liquid crystal molecules with any orientation between the slit electrodes and right above the slit electrodes are capable of being rotated, thereby improving operating efficiency of the liquid crystal molecules and improving the light transmitting efficiency. The display substrate has advantages such as high resolution, high transmittance, low power consumption, wide view angle, high aperture ratio, low chromatic aberration and no push Mura.

Figure 2A:
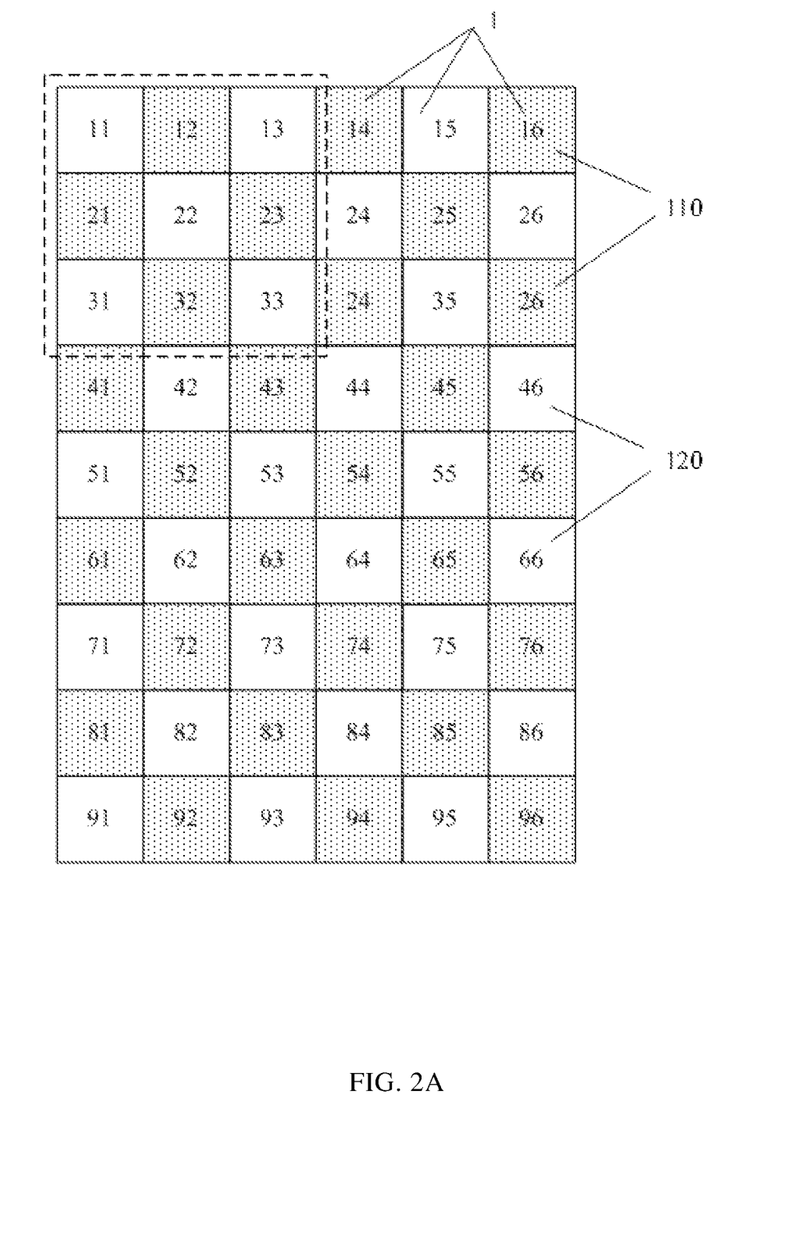
FIG. 2A is a schematic diagram illustrating an arrangement of test groups of electrode blocks of a display substrate according to a first embodiment of the present invention.

In the display substrate of the present embodiment, each electrode block forms as a touch sensor unit, i.e., a self-capacitive touch electrode. As shown in FIG. 2A, a common electrode in an effective display area is divided into a plurality of electrode blocks 1 along two directions perpendicular to each other (e.g., along a horizontal direction and a vertical direction), and each electrode block 1 is a self-capacitive touch electrode. For example, the common electrode is divided into M×N square areas with a fixed size, each of which is used as one electrode block 1, that is, forms a self-capacitive touch electrode. In FIG. 2A, the common electrode is divided into 54 electrode blocks, where M=9 and N=6, as an example. In the following descriptions of the present embodiment, an area with a size of 3×3 in the dashed box in FIG. 2A will be selected for describing the ET structure in detail.

Figure 2B:
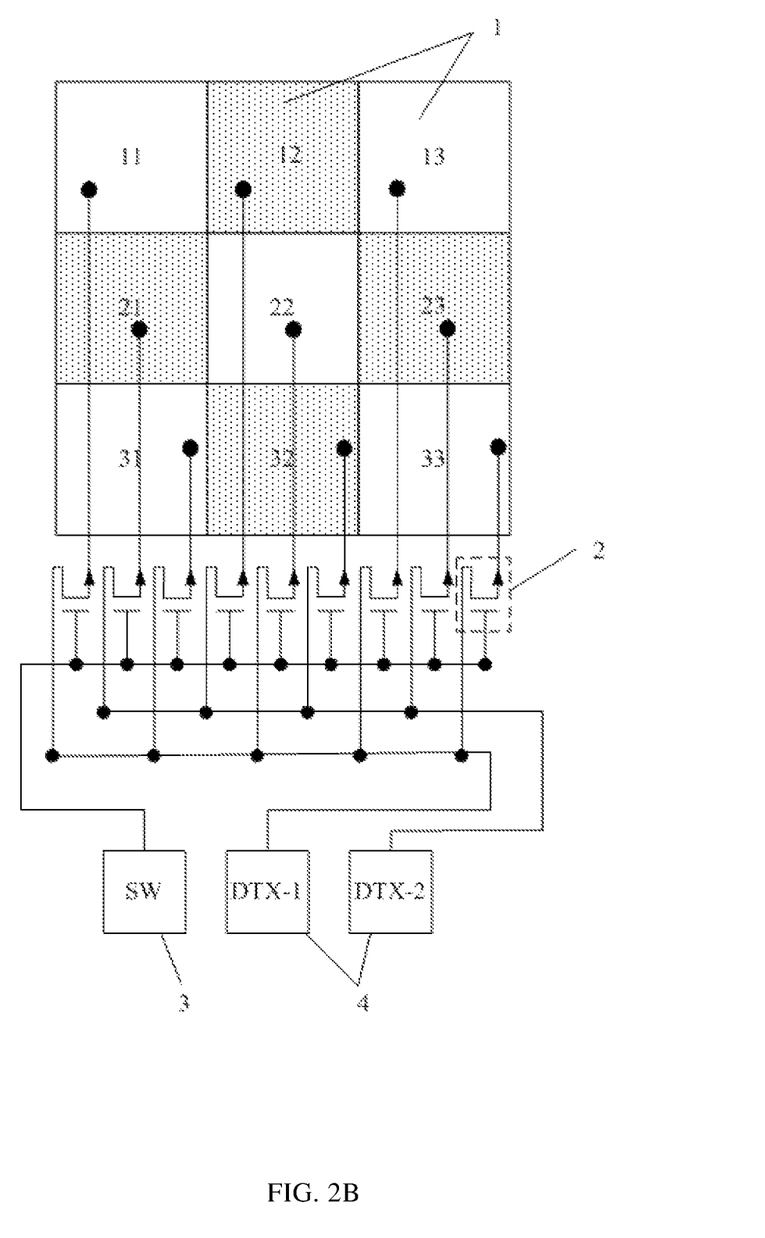
FIG. 2B is a partial schematic diagram of an ET structure of the display substrate according to the first embodiment of the present invention.

Specifically, as shown in FIG. 2B, the test unit includes one driving signal terminal 3, test signal terminals 4 whose number is the same as that of the test sub-units, and a plurality of switch thin film transistors 2 whose number is the same as that of the electrode blocks 1, the test signal terminals 4 being in a one-to-one correspondence with the test groups, wherein, gate electrodes of all the switch thin film transistors 2 are connected to the driving signal terminal 3, a source electrode of each switch thin film transistor 2 is connected to one of the electrode blocks 1, and a drain electrode of the each switch thin film transistor 2 is connected to one of the test signal terminals 4 which corresponds to the test group to which the one of the electrode blocks 1 connected to the source electrode of the each switch thin film transistor 2 belongs.

In the present embodiment, the display substrate includes a display area and a non-display area surrounding a periphery of the display area, the plurality of pixel regions are located in the display area, the test units are provided in the non-display area, and the electrode blocks 1 may be connected to the source electrodes of the switch thin film transistors 2 through metal wires.

As an example, the test unit may include a first test sub-unit and a second test sub-unit, the test groups may include a first test group and a second test group, every other electrode blocks 1 in the row direction and the column direction are set as the first test group, and the remaining electrode blocks 1 are set as the second test group; the electrode blocks 1 (i.e., first electrode blocks 110 in FIG. 2A) of the first test group are electrically connected to the first test sub-unit, and the electrode blocks 1 (i.e., second electrode blocks 120 in FIG. 2A) of the second test group are electrically connected to the second test sub-unit.

That is, the first electrode blocks 110 of the first test group and the second electrode blocks 120 of the second test group, as a whole, are arranged in a matrix manner. Adjacent electrode blocks at both sides of each of the first electrode blocks 110 of the first test group in the row direction and the column direction are the second electrode blocks 120 of the second test group, and adjacent electrode blocks at both sides of each of the second electrode blocks 120 of the second test group in the row direction and the column direction are the first electrode blocks 110 of the first test group, expect for the outermost electrode blocks located at edges of the display area of the display substrate.

Each electrode block 1 corresponds to a plurality of pixel regions. For example, a size of each electrode block 1 is comparable to an area touched by a finger. For example, a size of each electrode block is 4 mm×4 mm, so as to achieve a balance between touch accuracy and circuit simplification.

In the display substrate shown in FIG. 2B, the electrode blocks 1 forming the self-capacitive touch electrodes are divided into two test groups (each electrode block 1 is denoted by two-digit number, the first digit indicates which row an electrode block 1 is located at and the second digit indicates which column the electrode block 1 is located at). The first test group includes an electrode block 11, an electrode block 13, an electrode block 22, an electrode block 31, and an electrode block 33, while the second test group includes an electrode block 12, an electrode block 21, an electrode block 23, and an electrode block 32. The electrode blocks of a same group are not adjacent to each other in the row direction and the column direction. The electrode blocks of the first test group are connected to a first test signal terminal 4 (i.e., DTX-1) through respective switch thin film transistors 2, the electrode blocks of the second test group are connected to a second test signal terminal 4 (i.e., DTX-2) through respective switch thin film transistors 2, and the gate electrode of each switch thin film transistor 2 is connected to the driving signal terminal 3 (i.e., SW) so as to control ON and OFF of the switch thin film transistor 2.

The above division manner with respect to the electrode blocks 1 in the display substrate is simple and facilitates fabrication, while the test units have a simple structure and are capable of ensuring reliability of test results.

Accordingly, the present embodiment further provides a method for testing a display substrate. The test method corresponds to the above display substrate. That is, the display substrate includes a plurality of pixel regions arranged in a matrix manner and a test unit, each of the pixel regions being provided with a first electrode, wherein the test unit includes at least two test sub-units; the first electrodes provided in adjacent pixel regions correspond to an electrode block 1, and the electrode blocks 1 are electrically isolated from each other and divided, in accordance with their positions, into at least two test groups whose number is the same as that of the test sub-units; the electrode blocks 1 belonging to a same test group are provided to be spaced apart from each other in both row and column directions, and all the electrode blocks 1 in the same test group are connected to one of the test sub-units.

The method includes steps of applying a same voltage or different voltages to the electrode blocks 1 belonging to different test groups, and determining, according to colors displayed in the pixel regions of the display substrate, the display function of the display substrate and the electrical properties of self-capacitive touch electrodes formed by the electrode blocks 1.

For example, the test unit may include one driving signal terminal 3, test signal terminals 4 whose number is the same as that of the test sub-units, and a plurality of switch thin film transistors 2 whose number is the same as that of the electrode blocks 1, wherein gate electrodes of all the switch thin film transistors 2 are connected to the driving signal terminal 3, a source electrode of each switch thin film transistor 2 is connected to one of the electrode blocks 1, and a drain electrode of the each switch thin film transistor 2 is connected to one of the test signal terminals 4 which corresponds to the test group to which the one of the electrode blocks 1 connected to the source electrode of the each switch thin film transistor 2 belongs.

The method may include steps of applying, according to types of the switch thin film transistors 2, a voltage to the gate electrodes of the switch thin film transistors 2 through the driving signal terminal 3 such that the switch thin film transistors 2 are in an ON state; and applying a same voltage signal or different voltage signals to the drain electrodes of the plurality of switch thin film transistors 2 through different test signal terminals 4 (e.g., a first test signal terminal 4 (i.e., DTX-1) and a second test signal terminal 4 (i.e., DTX-2)), respectively, so as to test the display function of the display substrate and the open or short defect of self-capacitive electrodes formed by the electrode blocks 1.

Figure 3A:
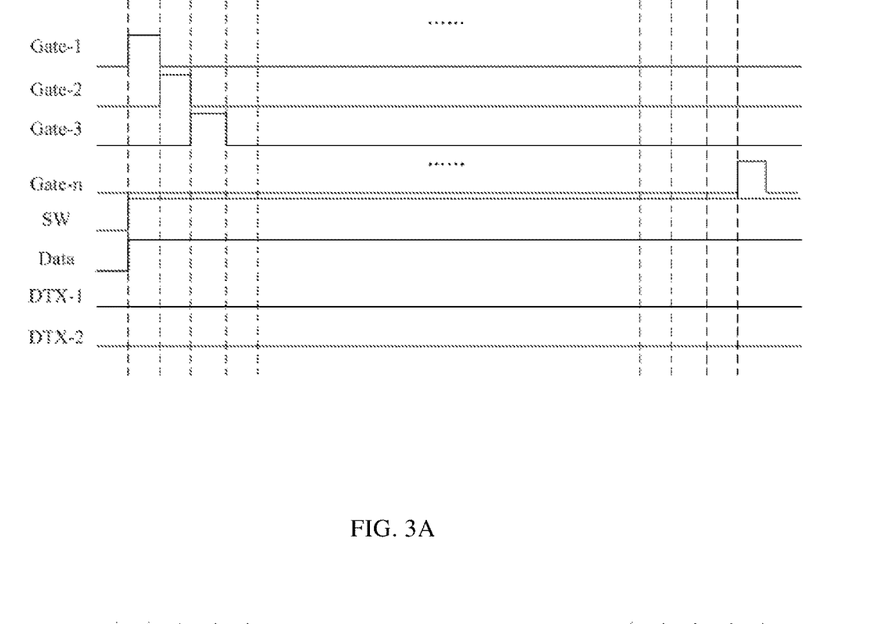
FIGS. 3A to 3C are timing diagrams of a method for testing the display substrate according to the first embodiment of the present invention.
Figure 3B:
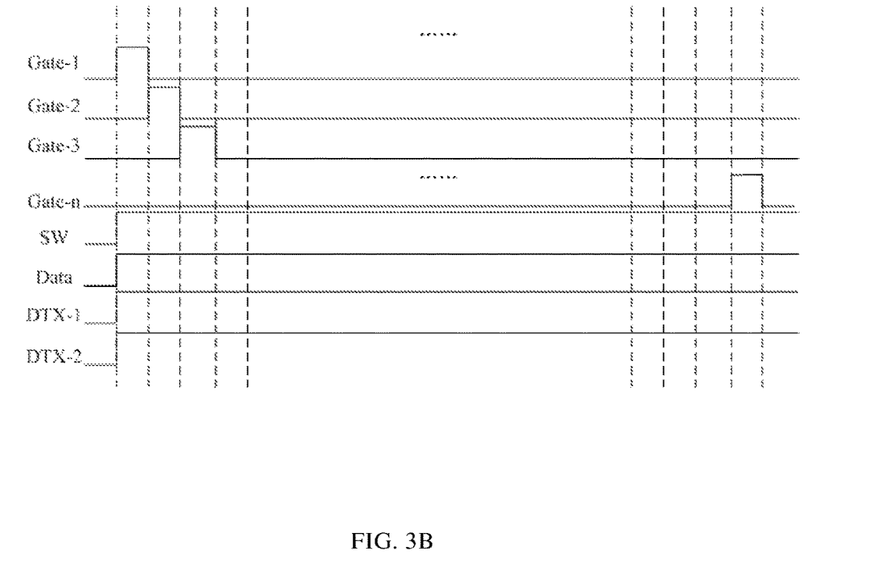
Figure 3C:
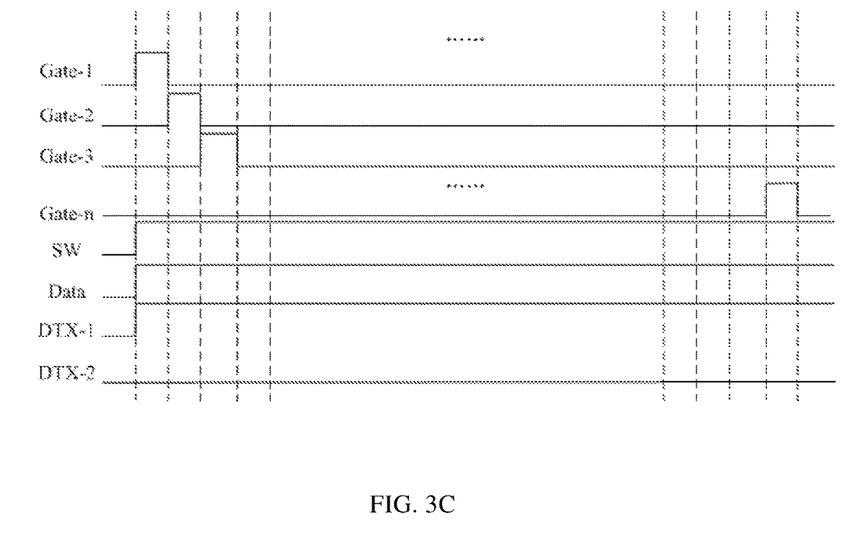

With reference to FIGS. 3A to 3C, in an electric test process, a square-wave signal of 15 V (which is set depending on actual needs) is sequentially loaded onto the gate electrodes (i.e., Gate-1, Gate-2, Gate-3, . . . , and Gate-n) of pixel thin film transistors in respective rows in a time period of one frame, such that the pixel thin film transistors in pixel regions in the respective rows are turned on accordingly. The data signal DATA for the source electrodes of the pixel thin film transistors in respective rows can be specifically distinguished as a red signal (Red), a green signal (Green) and a blue signal (Blue). For ease of descriptions, the data signal DATA in FIGS. 3A-3C is not specifically distinguished. The SW is always loaded with a voltage of 15 V (which is set depending on actual needs) in a time period of one frame, so as to control the output voltages of the pixel thin film transistors coupling to the data signal Data, and the output voltages of the switch thin film transistors 2 connected to the first test signal terminal DTX-1 and the second test signal terminal DTX-2. The first test signal terminal DTX-1 and the second test signal terminal DTX-2 may be loaded with zero voltage or high level voltage, depending on the test environment.

Here, it should be understood that, with respect to the display function, driving ICs have generally not been soldered in the electric test (ET) stage. In this case, in order to detect display defect, a test signal terminal for the data signal DATA (which has the same structure as that of the first test signal terminal DTX-1 or the second test signal terminal DTX-2, and not shown in FIG. 2B) may be provided for inputting Data signals, while a common voltage Vcom which is necessary for display is input to each electrode block 1 through an individual metal wire to ensure normal display function.

As a test environment, the switch thin film transistors 2 are kept in an ON state, and a same voltage is applied to the electrode blocks 1 of the two test groups through different test signal terminals 4 (i.e., the first test signal terminal DTX-1 and the second test signal terminal DTX-2), respectively. If the pixel regions corresponding to each electrode block 1 display a color corresponding to a set mode, it is determined that the display function of the display substrate is normal, and that the electrical properties of the self-capacitive touch electrodes formed by the electrode blocks 1 are normal. If pixel regions corresponding to an electrode block 1 display a color not corresponding to the set mode, it is determined that the self-capacitive touch electrode formed by the electrode block 1 has an open defect.

For example, with respect to the structure of the display substrate shown in FIG. 2A, the electrode blocks 1 are divided into two test groups, and the set mode is a normally black mode, in which the pixel regions display black images accordingly in a case where the electrode blocks 1 of the two test groups are not applied with voltage signals and the plurality of pixel regions are not applied with data signals Data. In this example, the method includes steps of:

applying a voltage of 0V to the electrode blocks 1 of the two test groups through different test signal terminals 4 (i.e., the first test signal terminal DTX-1 and the second test signal terminal DTX-2), respectively, and applying a data signal Data of 5V to the plurality of pixel regions, and if the pixel regions display white images accordingly, determining that the display function of the display substrate is normal; and applying a voltage of 5V to the electrode blocks 1 of the two test groups through different test signal terminals 4 (i.e., the first test signal terminal DTX-1 and the second test signal terminal DTX-2), respectively, and applying a data signal Data of 5V to the pixel regions, and, if the pixel regions corresponding to each electrode block 1 display black images, determining that the self-capacitive touch electrodes formed by the electrode blocks have no open defect, and if pixel regions corresponding to an electrode block 1 display a white image, determining that the self-capacitive touch electrode formed by the electrode block 1 has an open defect.

Figure 4A:
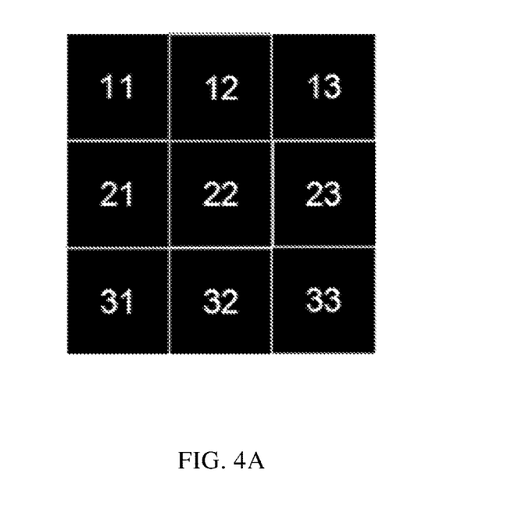
FIGS. 4A to 4E are schematic diagrams illustrating various test results of the method for testing the display substrate according to the first embodiment of the present invention.
Figure 4B:
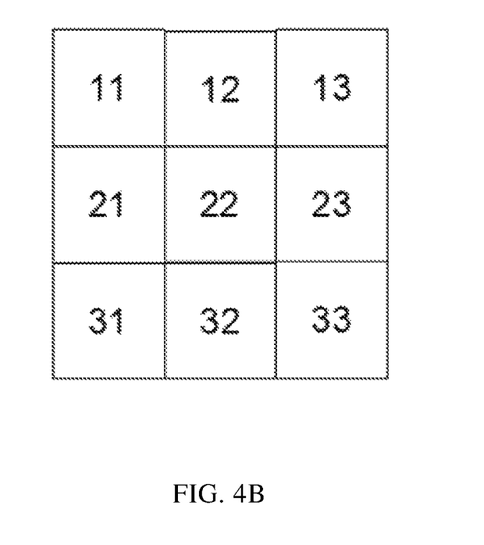

Specifically, as shown in the timing diagram of FIG. 3A, the SW is loaded with a positive voltage of 15V, so as to turn on all the switch thin film transistors 2; and, during a time period of one frame, the first test signal terminal DTX-1 and the second test signal terminal DTX-2 are always loaded with a voltage of 0V while the electrode blocks 1 are loaded with a voltage of 0V, such that all the self-capacitive touch electrodes are in 0V. In the pixel regions corresponding to the electrode blocks 1, the pixel thin film transistors (not shown in FIG. 2B) are loaded with appropriate voltage signals through their gate electrodes (or GOA signals from a gate driving circuit) and source electrodes (or signals from a source driving circuit), so as to realize display of red (Red), green (Green), blue (Blue) or grey-scale images correspondingly, and thus, the display related defects can be tested. When no signals are loaded, the display substrate displays a black screen as shown in FIG. 4A, and when the timing as shown in FIG. 3A is applied, the display substrate displays a white screen having a specific grey-scale as shown in FIG. 4B, depending on the amplitudes of the voltages of the data signals Data.

Figure 4C:
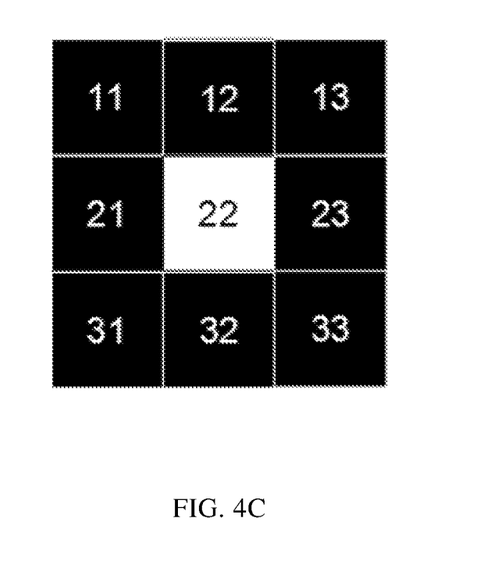

As shown in the timing diagram of FIG. 3B, the data signal Data, the signal of the first test signal terminal DTX-1 and the signal of the second test signal terminal DTX-2 are each loaded with a positive voltage of 5V (which is set depending on actual needs), respectively. If the self-capacitive touch electrodes have no open defect, the display substrate displays a white screen as shown in FIG. 4A, because the voltages of the pixel electrode and the common electrode are each 5V and thus there is no difference in voltage therebetween. If the electrode block 22 has an open defect, the electrode block 22 is in a floating state and a potential thereof maintains 0V or so, and pixel regions corresponding to the electrode block 22 will display a white image as shown in FIG. 4C because the data signal Data applied to the pixel electrode within the electrode block 22 is at 5V. As such, the open defect of the self-capacitive touch electrode in the display substrate can be tested.

As another test environment, the switch thin film transistors 2 are kept in an ON state, and different voltages are applied to the electrode blocks 1 of the two test groups through different test signal terminals 4, respectively. If pixel regions display a color corresponding to a set mode, it is determined that the self-capacitive touch electrode formed by the corresponding electrode block 1 has normal electrical properties; and if pixel regions display a color not corresponding to the set mode, it is determined that the self-capacitive touch electrode formed by the electrode block 1 has a short defect with a self-capacitive touch electrode formed by an adjacent electrode block.

As an example, the electrode blocks 1 are divided into to two test groups, and the set mode is a normally black mode, in which the pixel regions display black images accordingly in a case where the electrode blocks 1 of the two test groups are not applied with voltage signals and the pixel regions are not applied with data signals, as above example. In this example, the method may include steps of:

applying a voltage of 0V and a voltage of 5V to electrode blocks 1 of the two test groups through different test signal terminals 4, respectively, and applying a data signal Data of 5V to the pixel regions, and, if the pixel regions corresponding to adjacent electrode blocks 1 display a white image and a black image, respectively, determining that there is no short defect between the self-capacitive touch electrodes formed by the electrode blocks 1, and if the pixel regions corresponding to adjacent electrode blocks 1 each display a black image, determining that there is a short defect between the self-capacitive touch electrodes formed by the electrode blocks 1.

Figure 4D:
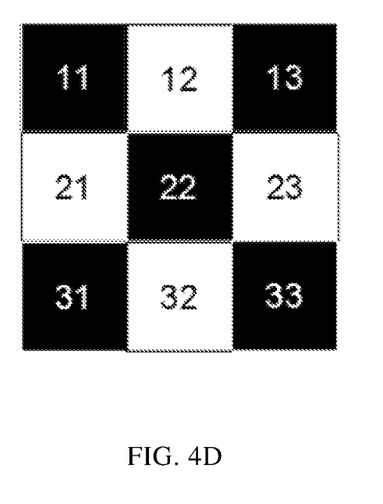
Figure 4E:
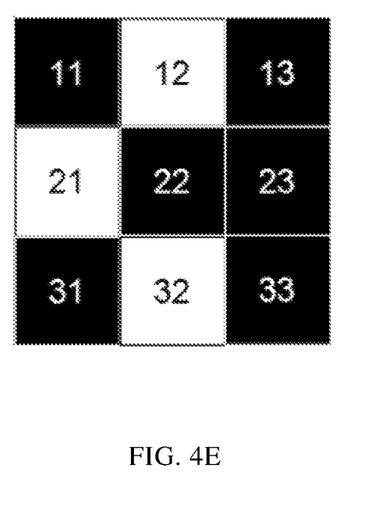

Specifically, as shown in the timing diagram of FIG. 3C, the data signal Data and the signal of the first test signal terminal DTX-1 are each loaded with a positive voltage of 5V (which is set depending on actual needs), while the signal of the second test signal terminal DTX-2 is loaded with a voltage signal of 0V. If there is no short defect between the self-capacitive touch electrodes, the pixel regions corresponding to the first group of the self-capacitive touch electrodes display black images because voltages of the pixel electrodes and the common electrodes of the first group of the self-capacitive touch electrodes are each in 5V and thus there is no difference in voltage therebetween, while the pixel regions corresponding to the second group of the self-capacitive touch electrodes display white images because there is a 5V difference in voltage between voltages of the pixel electrodes and the common electrodes of the second group of the self-capacitive touch electrodes. Therefore, the display substrate as a whole displays a screen in a black and white check, as shown in FIG. 4D. However, if there is a short defect between the electrode block 22 and the electrode block 23, the potential of the electrode block 23 will be pulled up to 5V or so by the electrode block 22, such that the pixel regions corresponding to the electrode block 23 display a black image instead of a white image, as shown in FIG. 4E. As such, the short defect existing between adjacent self-capacitive touch electrodes in the display substrate can be tested.

The test procedures on the display function of the liquid crystal display panel and the electrical properties of the touch electrodes have been described as above by taking the normally black mode as an example. However, the present invention is not limited thereto. It is easily to be understood that the tests can also be applied in a normally white mode by adjusting the voltages loaded to the first test signal terminal DTX-1 and the second test signal terminal DTX-2, for example, by loading a same voltage or different voltages to the first test signal terminal DTX-1 and the second test signal terminal DTX-2.

In the method for testing a display substrate according to the present embodiment, the switch thin film transistors may be of P type or N type without any limitations, as long as the required control mode can be satisfied.

In the present embodiment, the display substrate is described as a display substrate with an ADSDS mode by way of example, but the present invention is not limited thereto. The display substrate may be a display substrate with a VA mode, or the like.

In the display substrate of the present embodiment, the touch function can be preliminarily tested in a same manner as that for testing the display function by the improvement of the structure of the test unit and the use of the corresponding method for testing the display substrate. Therefore, it is possible to perform not only the existing test for the display function but also the preliminary test for the touch function of the display substrate in the test procedure for the display substrate, such that the open defect or short defect existing in the self-capacitive touch electrode formed by the electrode block can be detected, and that the detection rate of the defects can be improved, to the largest extent, before the assembling stage. The product yield of the display substrates can be improved, and it further ensures that the materials can be effectively used in the assembling stage, the loss of the materials due to the defects can be reduced in the assembling stage, the production costs are lowered, and the production profits are increased.

Second Embodiment

The present embodiment provides a display apparatus, which includes the display substrate of the first embodiment tested for the display function and touch function by using the above test method.

The display apparatus adopts the above display substrate having high yield, and thus have a better display and touch effect and more stable performance.

It should be understood that the foregoing implementations are merely exemplary embodiments used for the purpose of illustrating the principle of the present invention, and the present invention is not limited thereto. Various modifications and improvements can be made by those skilled in the art without departing from the spirit and essence of the present invention, and these modifications and improvements shall also regarded as the protection scope of the present invention.

What is claimed is:

1. A method for testing a display substrate, the display substrate comprising a plurality of pixel regions arranged in a matrix manner and a test unit, each of the pixel regions being provided with a first electrode, the test unit comprising at least two test sub-units, the first electrodes provided in adjacent pixel regions corresponding to an electrode block, the electrode blocks being electrically isolated from each other and divided, in accordance with their positions, into at least two test groups whose number is the same as that of the test sub-units, the electrode blocks belonging to a same test group being provided to be spaced apart from each other in both row and column directions by the electrode block belonging to another test group, all the electrode blocks in the same test group being connected to one of the test sub-units, the method comprising:
applying a same voltage or different voltages to the electrode blocks belonging to different test groups, and determining, according to colors displayed in the pixel regions of the display substrate, the display function of the display substrate and the electrical properties of self-capacitive touch electrodes formed by the electrode blocks,
wherein the test unit comprises one driving signal terminal, test signal terminals whose number is the same as that of the test sub-units, and a plurality of switch thin film transistors whose number is the same as that of the electrode blocks; the test signal terminals are in a one-to-one correspondence with the test groups; gate electrodes of all the switch thin film transistors are connected to the driving signal terminal, a source electrode of each switch thin film transistor is connected to one of the electrode blocks, and a drain electrode of the each switch thin film transistor is connected to one of the test signal terminals which corresponds to the test group to which the one of the electrode blocks connected to the source electrode of the each switch thin film transistor belongs; the method further comprises:
applying, according to types of the switch thin film transistors, a voltage to the gate electrodes of the switch thin film transistors through the driving signal terminal such that the switch thin film transistors are in an ON state; and
applying a same voltage signal or different voltage signals to the drain electrodes of the plurality of switch thin film transistors through different test signal terminals, respectively, so as to test the display function of the display substrate and the open or short defect of the self-capacitive electrodes formed by the electrode blocks,
wherein the method further comprises:
keeping the switch thin film transistors in the ON state, and applying a same voltage to the electrode blocks of the at least two test groups through different test signal terminals, respectively,
if the pixel regions corresponding to each electrode block display a color corresponding to a set mode, determining that the display function of the display substrate is normal, and that the electrical properties of the self-capacitive touch electrodes formed by the electrode blocks are normal; and
if the pixel regions corresponding to any electrode block display a color not corresponding to the set mode, determining that the self-capacitive touch electrode formed by the electrode block has an open defect, wherein the electrode blocks are divided into two test groups, and the set mode is a normally black mode, in which the pixel regions display black images accordingly in a case where the electrode blocks of the two test groups are not applied with voltage signals and the plurality of pixel regions are not applied with data signals; and the method further comprises:

applying a first voltage to the electrode blocks of the two test groups through different test signal terminals, respectively, and applying a data signal of a second voltage to the plurality of pixel regions, and if the pixel regions corresponding to each electrode block display white images having grey-scale, determining that the display function of the display substrate is normal; and applying the second voltage to the electrode blocks of the two test groups through different test signal terminals, respectively, and applying the data signal of the second voltage to the plurality of pixel regions, and, if the pixel regions corresponding to each electrode block display black images, determining that the self-capacitive touch electrodes formed by the electrode blocks have no open defect, and if pixel regions corresponding to any electrode block display a white image, determining that the self-capacitive touch electrode formed by the electrode block has an open defect, wherein the second voltage is higher than the first voltage.

2. The method for testing a display substrate according to claim 1, comprising:

keeping the switch thin film transistors in the ON state, and applying different voltages to the electrode blocks of the at least two test groups through different test signal terminals, respectively, if the pixel regions corresponding to each electrode block display a color corresponding to a set mode, determining that the electrical properties of the self-capacitive touch electrodes are normal; and if the pixel regions corresponding to any electrode block display a color not corresponding to the set mode, determining that there is a short defect between the self-capacitive touch electrode formed by the electrode block and a self-capacitive touch electrode formed by an adjacent electrode block.

3. The method for testing a display substrate according to claim 2, wherein the electrode blocks are divided into two test groups, and the set mode is a normally black mode, in which the pixel regions display black images accordingly in a case where the electrode blocks of the two test groups are not applied with voltage signals, and the method comprises:

applying the first voltage and the second voltage to electrode blocks of the two test groups through different test signal terminals, respectively;

if the pixel regions corresponding to adjacent electrode blocks display a white image and a black image, respectively, determining that there is no short defect between the self-capacitive touch electrodes formed by the electrode blocks; and if the pixel regions corresponding to adjacent electrode blocks each display a black image, determining that there is a short defect between the self-capacitive touch electrodes formed by the electrode blocks.

4. The method for testing a display substrate according to claim 1, wherein the first voltage is 0V and the second voltage is 5V.

5. The method for testing a display substrate according to claim 3, wherein the first voltage is 0V and the second voltage is 5V.

* * * * *